United States Patent

[11] 3,603,843

[72] Inventor Ralph E. Clements Rockford, Ill.
[21] Appl. No. 46,893
[22] Filed June 17, 1970
[45] Patented Sept. 7, 1971
[73] Assignee Barber-Colman Co. Rockford, Ill.

[54] TRANSIENT VOLTAGE PROTECTION CIRCUIT FOR GATE TURN ON DEVICES
10 Claims, 4 Drawing Figs.

[52] U.S. Cl. .......... 317/33 SC, 317/31, 317/50, 307/202, 307/252 T
[51] Int. Cl. .......... H02h 3/20, H03k 17/16
[50] Field of Search .......... 317/33, 50, 31; 307/202, 252 N, 252 T, 252 F, 93, 130

[56] References Cited

UNITED STATES PATENTS 3,424,948 1/1969 Rauas .......... 317/31

*Primary Examiner*—William M. Shoop, Jr.
*Assistant Examiner*—Harvey Fendelman
*Attorney*—A. Richard Koch

ABSTRACT: A circuit provides transient high voltage protection in a forward conducting direction to a nonconducting SCR by using the transient to generate a firing pulse for a unijunction transistor, permitting the discharge of a capacitor into the gate circuit of the SCR to turn on the latter before damage has occurred and allow the resultant power to be dissipated in the load.

INVENTOR.
RALPH E. CLEMENTS
BY
A. Richard Koch
AGENT

PATENTED SEP 7 1971 3,603,843

SHEET 2 OF 2

INVENTOR.
RALPH E. CLEMENTS
BY
A. Richard Koch
AGENT

TRANSIENT VOLTAGE PROTECTION CIRCUIT FOR GATE TURN ON DEVICES

BACKGROUND OF THE INVENTION

This invention pertains to a method and means for protecting nonconducting gate turn-on control devices from transient high voltage.

It is well known that voltage supplied by power lines contains transient high voltages resulting from lightning, switching of large loads, short circuits and other causes. Such transient voltages, taking the form of very short, sharp peaks when plotted against time, are commonly referred to as spikes. These spikes, or other excessive voltages, may exceed the forward breakover voltage of nonconducting gate turn-on control devices employed to selectively connect loads across the line, resulting in destruction of the device.

A logical way to avoid destruction of a control device by a spike is to employ a device having such a high breakover voltage that it will be immune to spikes. Because devices having such high breakover voltages may not be available or may be expensive, such a solution is not always practical. When the device is inexpensive, it may be satisfactory to merely replace a destroyed device. As the current and voltage ratings of control devices increase, their cost also increases, so a point is reached beyond which protection of the device is the only satisfactory solution.

In the past, control devices have been protected from transients in forward, reverse, or both directions by connecting in parallel with the device Zener diodes, controlled Avalanche rectifier diodes, breakover diodes, selenium rectifiers, or RC networks. Zener diodes and controlled Avalanche rectifier diodes used in this manner must have a voltage rating above line voltage and a power rating sufficient to dissipate the power surge without being damaged. The magnitude of available ratings is limited and such diodes having higher ratings are expensive. Breakover diodes dissipate less of the power surge, but they are expensive and not readily available. Selenium rectifiers are bulky and deteriorate when not in use. The capacitors required in RC networks must have high ratings and so become bulky and expensive.

SUMMARY OF THE INVENTION

This invention provides a novel method and means for transient high voltage protection to a nonconducting gate turn-on device in a forward conducting direction by turning it on and dissipating the resultant power in the controlled load before damage can occur to the device.

An object is to provide positive transient high voltage protection to a nonconducting gate turn-on device in a forward conducting direction.

Another object is to provide in a small package transient high voltage protection in a forward conducting direction to a nonconducting gate turn-on device.

A further object is to provide at low-cost transient high voltage protection in a forward conducting direction to a nonconducting gate turn-on device.

DESCRIPTION OF THE PREFERRED EMBODIMENTS

Figure 1:
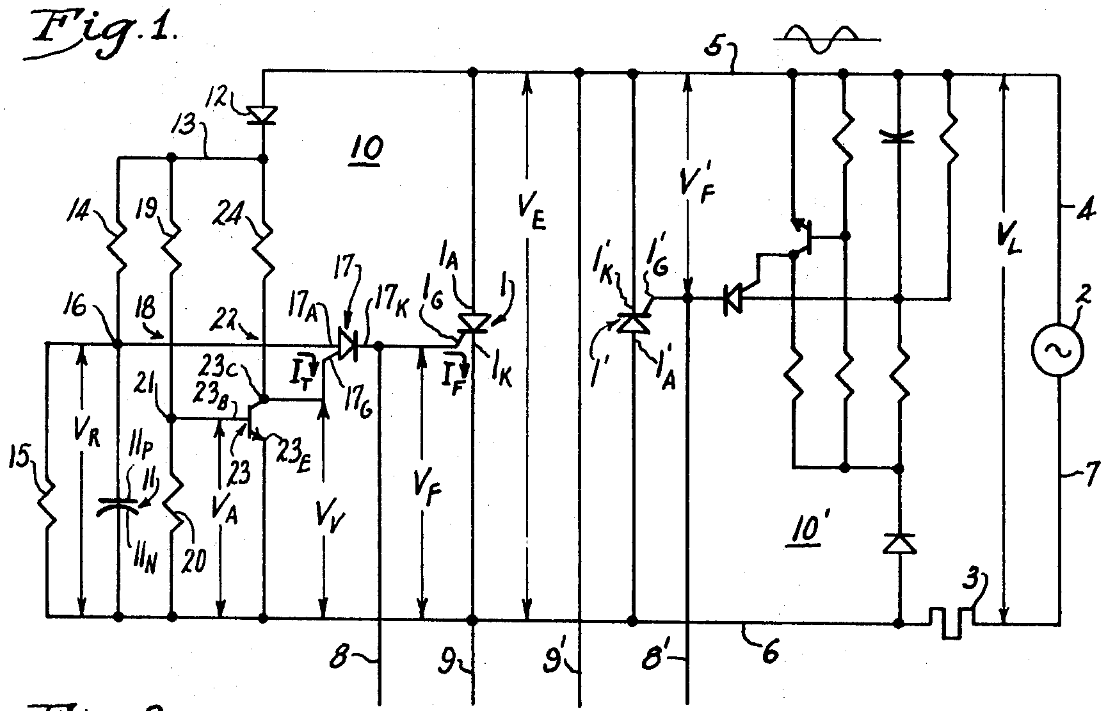
FIG. 1 is a schematic diagram showing a preferred species of this invention, employing in an AC circuit inverse parallel connected SCRs, each protected against transient high voltage in a forward conducting direction and therefore also protected in reverse direction.

FIG. 1 shows a pair of inverse parallel connected silicon controlled rectifiers (SCRs) 1 and 1' controlling a flow of alternating current between a power source 2 and a load 3, shown here as a heater. SCR 1 is turned on by a firing voltage $V_F$ applied between a firing terminal or gate $1_G$ and a common terminal or cathode $1_K$, the resulting firing current $I_F$ therebetween turning on the SCR 1 to permit current to flow through the SCR from a power terminal or anode $1_A$ to the cathode $1_K$, completing a circuit from power source 2 through a line 4, a conductor 5, the SCR 1, a conductor 6, heater 3, and a line 7 back to source 2. In like manner SCR 1' may be rendered conductive to permit current to flow in reverse direction from source 2 through line 7, heater 3, conductor 6, SCR 1', conductor 5 and line 4 back to source 2. The firing voltage $V_F$ for SCR 1 is ordinarily applied between lead 8 connected to gate $1_G$ and lead 9 connected to cathode $1_K$, while firing voltage $V'_F$ for SCR 1' is ordinarily applied between lead 8' connected to gate $1'_G$ and lead 9' connected to cathode $1'_K$ through conductor 5.

SCR 1 is protected against high voltage transients in the forward conducting direction ($1_A$ to $1_K$) by a protective circuit 10 connected between conductors 5 and 6 and to gate $1_G$. In it a storage means shown as a capacitor 11 is charged by positive half waves of current form source 2 through line 4, conductor 5, an isolating unidirectional conductor 12, a conductor 13 and a current limiting resistor 14 to its positive plate $11_P$, returning from its negative plate $11_N$ to source 2 through conductor 6, heater 3 and line 7. A voltage limiting resistor 15, paralleling capacitor 11, with current limiting resistor 14 forms between conductors 13 and 6 a DC voltage divider, which along with capacitor 11 establishes a steady state DC reference potential $V_R$ at a common junction 16 between them. A programmable unijunction transistor (PUT) 17 has its anode $17_A$ connected to common junction 16 and its cathode $17_K$ connected to SCR gate $1_G$. A second DC voltage divider 18 comprises resistors 19 and 20 connected in series between conductors 13 and 6 and joined together at a tap 21, providing between tap 21 and conductor 6 an intermediate voltage $V_A$ responsive to the instantaneous voltage $V_E$ between conductors 5 and 6. An inverting amplifier 22 comprises an NPN transistor 23, having its base $23_B$ connected to tap 21, its common emitter $23_E$ connected to conductor 6, and its collector $23_C$ connected through a collector resistor 24 and rectifier 12 to conductor 5. The protective circuit 10' protecting SCR 1' is identical to circuit 10 except that the connections to conductors 5 and 6 are reversed.

It seems appropriate at this time to describe a programmable unijunction transistor (PUT). It is a four layer PN semiconductor that is similar in its function to a two layer PN unijunction transistor (UJT), but it is more versatile—not having the built-in resistance of the UJT. In construction it is related to the familiar silicon controlled rectifier (SCR) and the silicon controlled switch (SCS). All are four layer PN semiconductors that selectively conduct an electric current from anode to cathode terminals at respective P and N end layers. The SCS has two gate terminals connected to respective intermediate layers. The anode gate terminal is adjacent the anode and the cathode gate terminal is adjacent the cathode. An SCS may be turned on in a number of different ways, such as by applying to the cathode gate a positive firing voltage with respect to the cathode, or by applying to the anode gate a negative firing voltage with respect to the anode. An SCR has only a cathode gate and is generally turned on by applying to the gate a positive firing voltage with respect to the cathode. A PUT has only an anode gate and may be turned on by applying to the gate a negative firing voltage with respect to the anode. As may seem obvious from the above brief description, an SCS may, by using only one of its gates, be substituted for either a SCR or a PUT. It also has other uses. All of these four layer gate turn on switches may be turned off by reducing the voltage between anode and cathode to substantially zero. A unijunction transistor (UJT) is a two layer PN semiconductor gate turn on switch, having base-one and base-two terminals at opposite ends of an N-type bar and a P-type emitter terminal on one side of the bar. The UJT is turned on to conduct electric current from the emitter to base-one when the emitter voltage exceeds a predetermined fraction of the base to base voltage and is turned off by reducing the emitter voltage to substantially zero. A Triac is a PN semiconductor gate turn on switch passing electric current in either direction between terminal one and terminal two when a firing voltage of either polarity is applied to its gate terminal. For a more complete description of SCRs and UJTs see General Electric's Transistor Manual, 7th Ed., 1964. For more information on SCRs and Triacs see General Electric's SCR Manual, 4th Ed., 1967. For PUTs see General Electric's bulletin 60.20, 11/67.

The operation of the protective circuit 10 will be described in detail and it is to be understood that circuit 10' operates in the same manner. When SCR 1 is nonconducting, the instantaneous voltage $V_E$ between conductors 5 and 6 is substantially the same as the AC line voltage $V_L$ supplied from power source 1. It is impressed across the SCR between the anode $1_A$ and cathode $1_K$. Rectifier 12 passes only positive half waves of the voltage $V_E$ to conductor 13, so that capacitor 11 is charged through current limiting resistor 14 to the DC reference potential $V_R$ as determined by voltage limiting resistor 15, which with resistor 14 forms a voltage divider between conductors 13 and 6. Because of the current limiter 14, the capacitor cannot change its charge rapidly with the result that the reference voltage $V_R$ does not immediately reflect changes in the line voltage $V_L$, but lags behind such changes. During negative half-cycles of the line voltage $V_L$, the capacitor 11 discharges at a slower rate, principally through resistor 15, so that the reference voltage $V_R$ responds to decreases in amplitude of the effective value of line voltage $V_L$ as well as to increases. The voltage divider 18, as shown, responds instantaneously to positive instantaneous line voltage $V_E$ above reference potential $V_R$, providing at tap 21 an intermediate voltage $V_A$ as the input to the inverting amplifier 22 at base $23_B$. As intermediate voltage $V_A$ increases, the NPN transistor 23 will draw more current through resistor 24, increasing the voltage drop across the resistor and lowering the variable potential $V_V$ at collector $23_C$. Whenever the potential $V_V$ falls below the reference potential $V_R$, as upon occurrence of a spike, the PUT 17 is turned on by a triggering current $I_T$ from the positive plate $11_P$ through junction 16, anode $17_A$, anode gate $17_G$, collector $23_C$, emitter $23_E$ and conductor 6 to the negative plate $11_N$, whereupon the PUT 17 conducts, completing a circuit from positive plate $11_P$ through junction 16, anode $17_A$, cathode $17_K$, gate $1_G$, cathode $1_K$ and conductor 6 to the negative plate $11_N$, permitting the firing current $I_F$ to flow through the input circuit of SCR 1, turning it on so that the voltage $V_E$ between anode $1_A$ and cathode $1_K$ falls instantaneously from line voltage $V_L$ to the forward voltage drop of the conducting SCR 1 as most of the line voltage $V_L$ is diverted to the load 3, where most of the resulting power is dissipated. The response time of the protective circuit 10 is on the order of 100 nanoseconds, which is fast enough to protect the nonconducting SCR 1 from transient high voltages in the forward direction. Since the forward voltage drop across SCR 1 is the reverse voltage drop across SCR 1' and vice versa, it will be seen that the protective circuits 10 and 10' will together protect both SCR 1 and SCR 1' from high voltage transients in either forward or reverse directions.

The voltage divider 18 could be an AC voltage divider if connected to conductor 5 instead of 13 so that the intermediate voltage $V_A$ would follow instantaneous voltage $V_E$ independent of reference voltage $V_R$ or the polarity of instantaneous voltage $V_E$. The resulting negative and periodically lower positive values of $V_A$ would only cause correspondingly higher variable potentials $V_V$ which would prevent firing of the PUT 17 during these periods, since the variable potential $V_V$ would be higher than reference voltage $V_R$. PUT 17 would still fire when variable potential $V_V$ fell below reference voltage $V_R$ so the results would be the same as with the circuitry shown.

Figure 2:
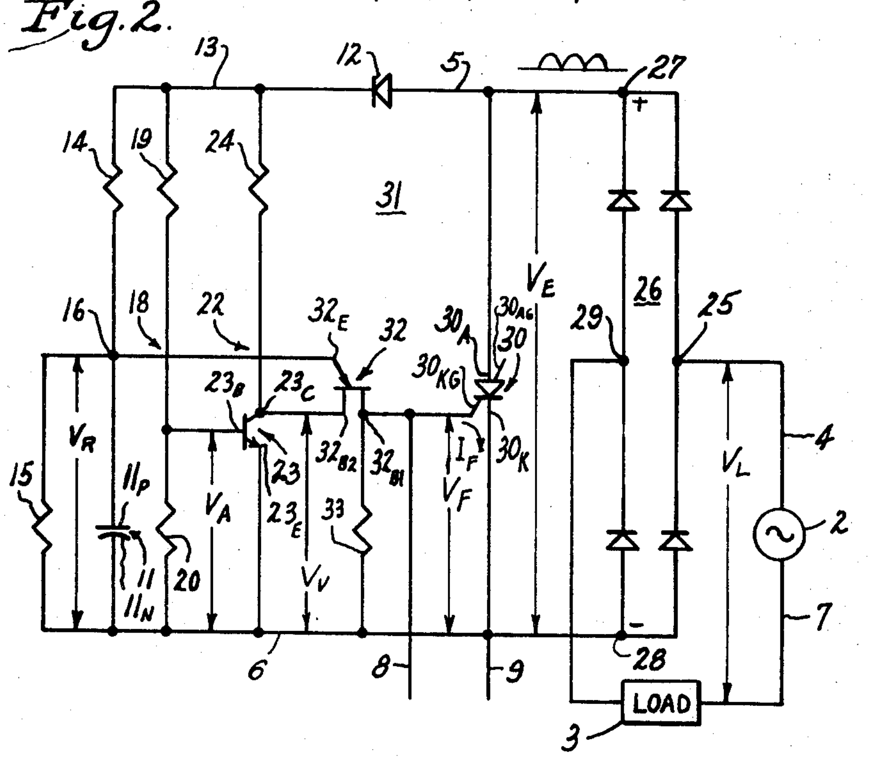
FIG. 2 is a schematic diagram showing another species of this invention employing in an AC circuit a full-wave rectifier supplying pulsating DC to an SCS protected against transients in either direction.

In the species of FIG. 2, as in all figures, any components corresponding to those in FIG. 1 bear the same reference numerals and the same voltage and current references have been used for corresponding characteristics. Only the different features will be described. The AC power source 2 is connected through line 4 to an AC terminal 25 of a rectifier 26, shown as a full wave rectifying bridge. The positive DC terminal 27 to connected to conductor 5 and the negative DC terminal 28 is connected to conductor 6. As shown, an AC load 3 is connected between the AC power source 2 and AC terminal 29. If a DC load instead of an AC load were to be energized, line 7 would be connected directly to AC terminal 29 and the DC load would be inserted between one of the DC terminals 27 and 28 and the respective conductor 5 or 6. In either case conductor 5 is never negative with respect to conductor 6 so only a single unidirectional gate turn on device is required to control energization of the load. As shown the device is an SCS 30 having its anode $30_A$ connected to conductor 5, its cathode $30_K$ connected to conductor 6, its cathode gate $30_{KG}$ connected to lead 8, and its anode gate $30_{AG}$ is disconnected so that the SCS acts as an SCR and is suitable for use only when the instantaneous voltage $V_E$ periodically falls to zero, as it does in an unfiltered rectified AC voltage supply, whether full or half wave. When the SCS 30 is turned off by reduction of the instantaneous voltage $V_E$ to zero, the rectifier 12 prevents discharge of capacitor 11 from maintaining a positive voltage across SCS 30. If the power supply voltage were a steady DC or filtered rectified AC, the SCS 30 could be periodically turned off as by applying a positive pulse to the anode gate $30_{AG}$.

The protective circuit 31 is identical to circuit 10 in FIG. 1 except that a unijunction transistor 32 has replaced the PUT 17. Its emitter $32_E$ is connected to the junction 16, base-one $32_{B1}$ to the cathode gate $30_{KG}$, and base-two $32_{B2}$, which is the control terminal, to the collector $23_C$. A resistor 33 is connected between base-one $32_{B1}$ and conductor 6. When the variable output voltage $V_V$ at base-two $32_{B2}$ falls sufficiently so that the reference potential $V_R$ triggers the UJT 32 into conduction, firing current $I_F$ passes from the positive plate $11_P$ through junction 16, emitter $32_E$, base-one $32_{B1}$, gate $30_{KG}$, cathode $30_K$ and conductor 6 to the negative plate $11_N$ to turn on SCS 30 and so reducing the instantaneous voltage $V_E$ between its anode $30_A$ and its cathode $30_K$ while transferring most of the line voltage $V_L$ to the load 3, where most of the resulting power is dissipated. The SCS 30 is thus protected from forward high voltage transients and, since conductor 6 is never positive with respect to conductor 5, no reverse high voltage transient protection is required.

Figure 3:
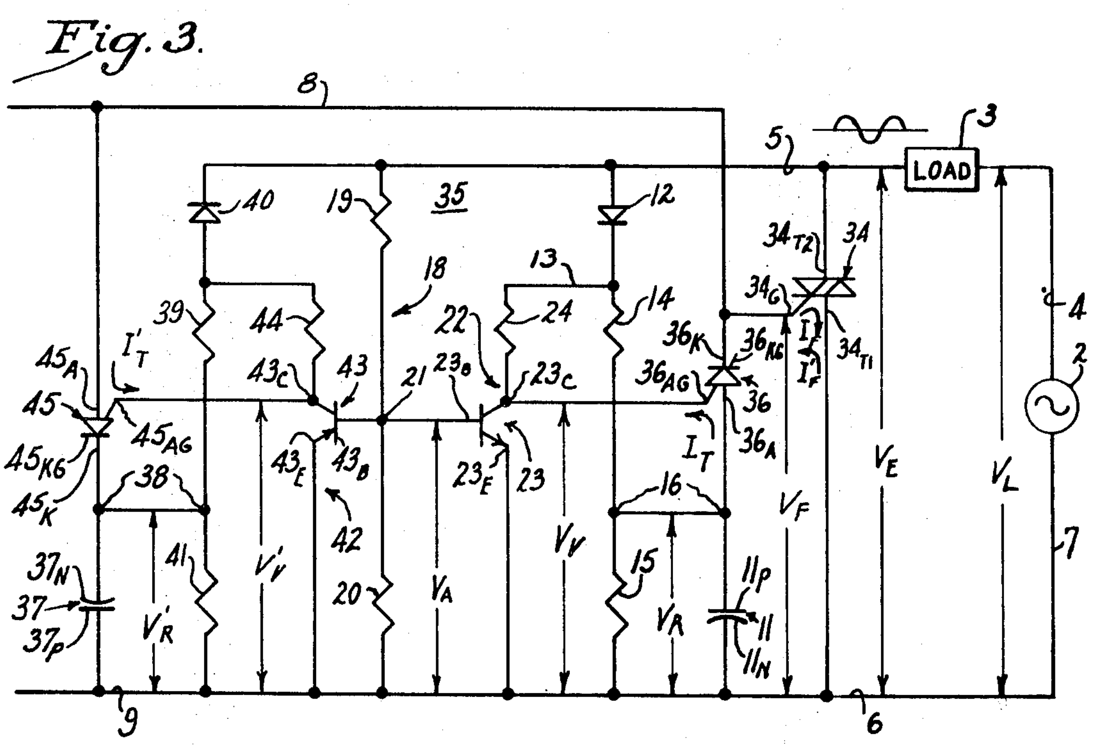
FIG. 3 is a schematic diagram showing a species employing in an AC circuit a Triac protected against transient voltages in either direction.

In FIG. 3 the load 3 has been interposed between line 4 and conductor 5, while line 7 is connected directly to conductor 6 merely to show alternative connections. Current through the load is controlled by a Triac 34, shown with terminal one $34_{T1}$ connected to conductor 6 and terminal two $34_{T2}$ connected to conductor 5, although they could be reversed. The gate $34_G$ is connected to lead 8.

The right half of protective circuit 35 is substantially identical to protective circuit 10 in FIG. 1, although it has been rearranged. It differs in voltage divider 18 being connected to conductor 5 instead of 13, as explained in the description of FIG. 1, and in using an SCS 36 instead of PUT 17. The SCS 36 is connected to act as a PUT with its anode $36_A$ connected to junction 16, cathode $36_K$ to gate $34_G$, and anode gate or control terminal $36_{AG}$ to collector $23_C$, while cathode gate $36_{KG}$ is disconnected. The left half of protective circuit 35 is what may be thought of as a mirror image of the right half. Capacitor 37 has its positive plate $37_P$ connected to the conductor 6 and its negative plate $37_N$ to conductor 5 through junction 38, current-limiting resistor 39 and isolating rectifier 40 so that it is charged by negative half-waves of current from source 2, that is, it is charged by current from source 2 through line 7 and conductor 6 to positive plate $37_P$, returning from negative plate $37_N$ through junction 38, current limiting resistor 39, isolating rectifier 40, conductor 5, load 3 and line 4 to source 2. The charge on capacitor 37 is limited by a parallel voltage limiting resistor 41, which with resistor 39 forms a DC voltage divider between conductors 5 and 6. An inverting amplifier 42 comprises a PNP transistor 43 and a collector resistor 44. The base $43_B$ of the transistor 43 is connected to the tap 21, emitter $43_E$ to the conductor 6 and collector $43_C$ through resistor 44 and rectifier 40 to conductor 5. An SCS 45 is connected as a PUT with its anode $45_A$ connected to the gate $34_G$ through lead 8, its cathode $45_K$ to junction 38, and its anode gate or control terminal $45_{AG}$ to the collector $43_C$, while its cathode gate $45_{KG}$ is disconnected.

The right half of the protective circuit 35 acts exactly the same as protective circuit 10 in FIG. 1 when an AC voltage divider is employed, protecting Triac 34 from transient high voltages on conductor 5. When conductor 6 is positive with respect to conductor 5, capacitor 37 is charged to DC reference potential $V'_R$ in the same manner as capacitor 11 was charged to DC reference potential $V_R$. The polarities of $V_R$ and $V'_R$ are reversed, but their amplitudes are substantially identical. Also, when conductor 6 is positive, the polarity of intermediate voltage $V_A$ reverses, since the voltage divider 18 now has AC rather than DC impressed upon it as in FIG. 1. This makes tap 21 negative with respect to conductor 6 the same proportion to the instantaneous voltage $V_E$ when it is positive. As tap 21 goes more negative, more current is drawn through the base-emitter junction of the PNP transistor 43, causing more current to flow from conductor 6 through emitter $43_E$, collector $43_C$, resistor 44 and rectifier 40 to conductor 5. The increased flow through resistor 44 reduces the negative variable output voltage $V'_V$. The voltage between anode $45_A$ and cathode $45_K$ is substantially equal to $V'_R$, as can be seen by tracing a circuit from the positive plate $37_P$ through conductor 6, terminal $34_{T1}$, gate $34_G$ and lead 8 to anode $45_A$. The only loss in this circuit is a small drop between terminal $34_{T1}$ and gate $34_G$, which cannot be very large since it would turn on the Triac 34 if it were substantial. The cathode $45_K$ is connected to plate $37_N$ at junction 38, so they have the same potential. The voltage between anode $45_A$ and cathode $45_K$ is therefore less than $V'_R$ by only the small drop between terminal $34_{T1}$ and gate $34_G$. When variable voltage $V'_V$ falls below reference voltage $V'_R$ minus the small voltage drop between terminal $34_{T1}$ and gate $34_G$, the SCS 45 will be turned on by a triggering current $I'_T$ flowing apparently from positive plate $37_P$ through conductor 6, terminal $34_{T11}$, gate $34_G$, lead 8 anode $45_A$, anode gate $45_{AG}$, resistor 44, resistor 39 and junction 38 to negative plate $37_N$. This current $I'_T$ is probably insufficient to fire the Triac 34, but, by immediately turning on the SCS 45, a circuit is completed allowing a firing current $I'_F$ to flow from the positive plate $37_P$ through conductor 6, terminal $34_{T1}$, gate $34_G$, lead 8, anode $45_A$, cathode $45_K$ and junction 38 to the negative plate $37_N$. This current $I'_F$ fires the Triac 34 to complete a circuit from source 2 through line 7, conductor 6, terminal $34_{T1}$, terminal $34_{T2}$, conductor 5, load 3 and line 4 back to the source 2. This causes the high instantaneous voltage $V_E$ to fall to the forward voltage drop across the Triac, so that the Triac 34 is protected, while most of the power is dissipated in the load 3. In this manner the protective circuit 35 protects the Triac 34 form spikes of voltage in either direction.

Figure 4:
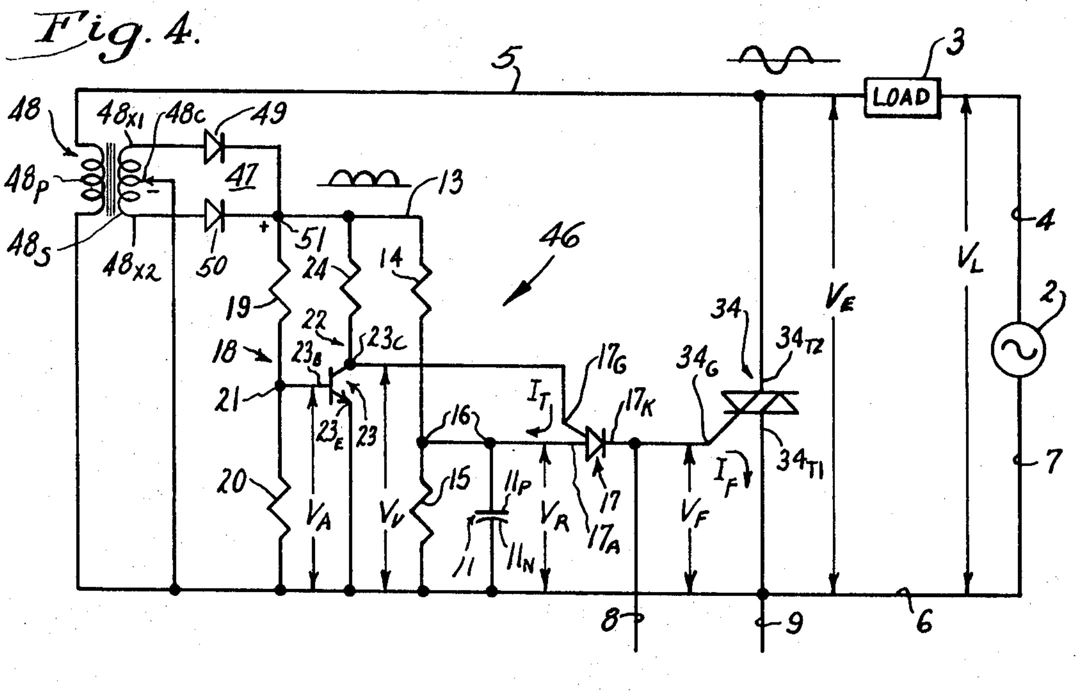
FIG. 4 is a schematic diagram showing another species protecting a Triac.

In FIG. 4 is shown a protective circuit 46 for a bidirectional semiconductor switch 34. An isolated full-wave rectifier network 47 replaces the rectifier 12 between conductors 5 and 13. As shown, the network 47 comprises an isolating transformer 48 having a primary winding $48_P$ connected between the conductors 5 and 6, and a secondary winding $48_S$ having a center tap $48_C$ and end terminals $48_{X1}$ and $48_{X2}$. A pair of similarly poled rectifying diodes 49 and 50 connect ends $48_{X1}$ and $48_{X2}$ respectively to a common pole 51. As shown, the pole 51 is positive and center tap $48_C$ is negative. The negative pole is connected to conductor 6, while the positive pole is connected to conductor 13. Protective circuit 46 is otherwise the same as 10 in FIG. 1. Since the protective circuit 46 receives two positive pulses of voltage for each cycle of AC from source 2, one of said positive pulses being the inverted negative pulse of AC any spike, regardless of polarity, will appear as a positive spike to protective circuit 46 and result in firing the protected Triac 34, as previously explained. The Triac is therefore protected from spikes of either polarity.

It will be recognized that still different species may be obtained by different combinations of the components and that the invention is not limited to the species described, buy only by the scope of the claims.

As used in the claims a unijunction device is a unijunction transistor or any component that functions comparably to a unijunction transistor, such as a programmable unijunction transistor or a silicon controlled switch. A gate turn on device is a component rendered conductive by a signal at a gate or firing terminal regardless of the turnoff mechanism. It may conduct current in one or both directions.

I claim:

1. A method for protecting a gate turn on device having a power terminal, a firing terminal and a common terminal comprising the steps of establishing a DC reference potential, producing a variable voltage inversely proportional to an instantaneous voltage appearing between the power and common terminals, and applying the reference potential between said firing and common terminals as the variable voltage falls below said reference potential.

2. A protective circuit for a gate turn-on device controlling a flow of electricity between a power source and a load, said device having a power terminal, a firing terminal and a common terminal, said circuit comprising a junction, means providing a DC reference potential connected between said junction and the common terminal, a unijunction device connected to selectively conduct a firing current between said junction ad the firing terminal, said unijunction device having a control terminal, and means supplying to said control terminal a variable potential inversely proportional to an instantaneous voltage applied between the power and common terminals whereby said unijunction device is rendered conductive when the variable potential falls below said reference potential.

3. A protective circuit as in claim 2, said means supplying the DC reference potential comprising a capacitor having a first plate connected to the common terminal and a second plate connected to said junction, means connected between the junction and said power terminal to delay charging of said capacitor, a unidirectional conductor in series with the delay means between the junction and said power terminal, and means limiting said DC reference potential.

4. A protective circuit as in claim 2, in which the unijunction device is a two layer PN unijunction transistor having an emitter connected to said junction, a base-one connected to said firing terminal, and a base-two comprising said control terminal.

5. A protective circuit as in claim 2, in which the unijunction device is a four layer PN programmable unijunction transistor having an anode, a cathode and an anode gate, said anode connected to the junction, said cathode connected to the firing terminal, and said anode gate comprising the control terminal.

6. A protective circuit as in claim 2, said means supplying the variable potential comprising a voltage divider connected to be energized in proportion to the instantaneous voltage applied between said power and common terminals, said voltage divider having a tap providing an intermediate voltage, and an inverting amplifier providing said variable potential as an output in response to the intermediate voltage received from said tap as an input.

7. A protective circuit as in claim 6, said amplifier comprising a transistor having a base connected to said tap, a collector connected to the control terminal and a common emitter connected to said common terminal, and a load resistance connected between the power terminal and said collector.

8. A protective circuit as in claim 2 with the addition of means for electrically isolating said circuit from the power terminal.

9. A protective circuit as in claim 8, in which the isolating means is a transformer.

10. A protective circuit for a bidirectional gate turn-on device controlling flow of an AC current between first and second conductors, said device having first and second terminals connected to said respective first and second conductors and a firing terminal, said circuit comprising a voltage divider connected between said first and second conductors, a tap on said voltage divider, a first capacitor having a first positive plate connected to the second conductor and a first negative plate, a first rectifier connected to conduct current from said second to said first conductor, a first current-limiting resistor in series with said first rectifier between the first negative plate and the first conductor, a first voltage limiting resistor in parallel with said first capacitor, a second capacitor having a second negative plate connected to the second conductor and a second positive plate, a second rectifier connected to conduct current from said first conductor to said second positive plate, a second current limiting resistor in series with said second rectifier between the second positive plate and the first conductor, a second voltage limiting resistor in parallel with said second capacitor, a PNP transistor, an NPN transistor, each of said transistors having a base an emitter and a collector, said bases being connected to the tap, said emitters being connected to the second conductor, a pair of load resistors connected between respective ones of said collectors and the first conductor, a first unijunction device connected to conduct current from said firing terminal to the first negative plate and having a first control terminal connected to the collector of said PNP transistor, and a second unijunction device connected to conduct current from said second positive plate to the firing terminal and having a second control terminal connected to the collector of said NPN transistor.